(12) United States Patent
Bailey et al.

(10) Patent No.: US 10,197,805 B2
(45) Date of Patent: Feb. 5, 2019

(54) SYSTEMS, DEVICES, AND METHODS FOR EYEBOXES WITH HETEROGENEOUS EXIT PUPILS

(71) Applicant: North Inc., Kitchener (CA)

(72) Inventors: Matthew Bailey, Kitchener (CA); Stefan Alexander, Elmira (CA); Vance R. Morrison, Kitchener (CA); Thomas Mahon, Guelph (CA); Lloyd Frederick Holland, Kitchener (CA); Jaehong Choi, Waterloo (CA)

(73) Assignee: North Inc., Kitchener (CA)

( * ) Notice: Subject to any disclaimer, the term of this patent is extended or adjusted under 35 U.S.C. 154(b) by 0 days.

(21) Appl. No.: 15/145,583

(22) Filed: May 3, 2016

(65) Prior Publication Data

US 2016/0327796 A1   Nov. 10, 2016

Related U.S. Application Data

(60) Provisional application No. 62/156,736, filed on May 4, 2015.

(51) Int. Cl.
*G02B 5/18* (2006.01)
*G02B 5/32* (2006.01)
(Continued)

(52) U.S. Cl.
CPC ....... *G02B 27/0172* (2013.01); *G02B 5/1876* (2013.01); *G02B 5/32* (2013.01);
(Continued)

(58) Field of Classification Search
CPC ........ G02B 27/0172; G02B 2027/0178; G02B 2027/0141; G02B 27/017;
(Continued)

(56) References Cited

U.S. PATENT DOCUMENTS 3,408,133 A   10/1968   Lee
3,712,716 A    1/1973   Cornsweet et al.
(Continued)

FOREIGN PATENT DOCUMENTS

JP   61-198892 A    9/1986
JP   10-319240 A   12/1998
(Continued)

OTHER PUBLICATIONS

Amitai, "P-27: A Two-Dimensional Aperture Expander for Ultra-Compact, High-Performance Head-Worn Displays," *SID Symposium Digest of Technical Papers* 36(1):360-363, 2005.
(Continued)

*Primary Examiner* — Jade R Chwasz
(74) *Attorney, Agent, or Firm* — Cozen O'Connor

(57) ABSTRACT

Systems, devices, and methods for engineering the eyebox of a display using multiple heterogeneous exit pupils are described. The eyebox of a display includes at least two heterogeneous exit pupils that are different from one another in terms of size and/or shape. Heterogeneous exit pupils may overlap, one may encompass another, or they may be completely spatially-separated from one another. Such configurations enable specific eyebox and/or visual display configurations that can be advantageous in certain applications. An example in which a scanning laser-based wearable heads-up virtual retina display implements a holographic combiner that is engineered to provide multiple heterogeneous exit pupils is described.

15 Claims, 5 Drawing Sheets

(51) Int. Cl.
  *G03H 1/02* (2006.01)
  *G03H 1/22* (2006.01)
  *G03H 1/26* (2006.01)
  *G02B 26/10* (2006.01)
  *G02B 27/01* (2006.01)

(52) U.S. Cl.
  CPC .......... *G02B 26/10* (2013.01); *G02B 27/017* (2013.01); *G02B 27/0176* (2013.01); *G03H 1/0252* (2013.01); *G03H 1/2286* (2013.01); *G03H 1/265* (2013.01); *G03H 1/2645* (2013.01); *G02B 2027/015* (2013.01); *G02B 2027/0123* (2013.01); *G02B 2027/0125* (2013.01); *G02B 2027/0174* (2013.01); *G02B 2027/0178* (2013.01); *G03H 2001/2292* (2013.01); *G03H 2001/266* (2013.01)

(58) Field of Classification Search
  CPC .... G02B 2027/0125; G02B 2027/0174; G02B 2027/0187; G02B 27/0101; G02B 2027/013; G02B 2027/0123; G02B 5/32; G02B 27/01; G02B 27/0176; G02B 2027/015; G02B 5/1876; G02B 26/10; G03H 1/0005; G03H 1/0252; G03H 1/0866; G03H 1/2645; G03H 1/264; G03H 2001/266; G03H 2001/2236; G03H 2225/52; G03H 2270/55; G03H 1/2286; G03H 1/265; G03H 2001/2292; H04N 13/044
  USPC ...... 359/3, 9, 10, 11, 13, 14, 15, 21, 22, 24, 359/27, 32, 35
  See application file for complete search history.

(56) References Cited

U.S. PATENT DOCUMENTS

| | | | |
|---|---|---|---|
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A * | 12/1996 | Morishima | G02B 5/32 345/7 |
| 5,596,339 A | 1/1997 | Furness, III et al. | |
| 5,742,421 A | 4/1998 | Wells et al. | |
| 5,760,931 A | 6/1998 | Saburi et al. | |
| 6,008,781 A | 12/1999 | Furness, III et al. | |
| 6,027,216 A | 2/2000 | Guyton et al. | |
| 6,139,146 A | 10/2000 | Zhang | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,545,778 B2 | 4/2003 | Ono et al. | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,233,204 B1 | 7/2012 | Robbins et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,223,152 B1 | 12/2015 | Kress et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2005/0219668 A1 | 10/2005 | Taghizadeh | |
| 2005/0234348 A1 | 10/2005 | Watanabe et al. | |
| 2006/0238770 A1 | 10/2006 | Elvesjo et al. | |
| 2007/0047038 A1 | 3/2007 | Takizawa | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 * | 3/2010 | Sugiyama | G02B 26/06 345/8 |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0157400 A1 | 6/2010 | Dimov et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0182224 A1 | 7/2013 | Schwiegerling et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0293591 A1 | 11/2013 | Miller et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0145777 A1 | 5/2015 | He et al. | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0325202 A1 | 11/2015 | Lake et al. | |

(56) References Cited

U.S. PATENT DOCUMENTS

| | | |
|---|---|---|
| 2015/0362734 A1 | 12/2015 | Moser et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2016/0004090 A1 | 1/2016 | Popovich et al. |
| 2016/0033771 A1 | 2/2016 | Tremblay et al. |
| 2016/0154244 A1 | 6/2016 | Border et al. |
| 2016/0202081 A1 | 7/2016 | Debieuvre et al. |
| 2016/0227164 A1 | 8/2016 | Klug et al. |
| 2016/0238845 A1 | 8/2016 | Alexander et al. |
| 2016/0246384 A1 | 8/2016 | Mullins et al. |
| 2016/0252742 A1 | 9/2016 | Wakabayashi |
| 2016/0274365 A1 | 9/2016 | Bailey et al. |
| 2016/0274758 A1 | 9/2016 | Bailey |
| 2016/0291543 A1 | 10/2016 | Saito |
| 2016/0313899 A1 | 10/2016 | Noel |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0377865 A1 | 12/2016 | Alexander et al. |
| 2016/0377866 A1 | 12/2016 | Alexander et al. |
| 2017/0068095 A1 | 3/2017 | Holland et al. |
| 2017/0097753 A1 | 4/2017 | Bailey et al. |
| 2017/0115483 A1 | 4/2017 | Aleem et al. |
| 2017/0153701 A1 | 6/2017 | Mahon et al. |
| 2017/0180690 A1 | 6/2017 | Jackson |
| 2017/0199383 A1 | 7/2017 | Machida |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |
| 2017/0343796 A1 | 11/2017 | Bailey et al. |
| 2017/0343797 A1 | 11/2017 | Bailey et al. |
| 2018/0007255 A1 | 1/2018 | Tang |
| 2018/0035087 A1 | 2/2018 | Xu |
| 2018/0045955 A1 | 2/2018 | Alexander et al. |
| 2018/0129052 A1 | 5/2018 | Morrison |
| 2018/0129057 A1 | 5/2018 | Morrison et al. |
| 2018/0129058 A1 | 5/2018 | Morrison et al. |

FOREIGN PATENT DOCUMENTS

| | | | |
|---|---|---|---|
| JP | 2013-127489 A | 6/2013 | |
| JP | 2013-160905 A | 8/2013 | |
| KR | 10-2004-0006609 A | 1/2004 | |
| WO | WO 2014155288 A2 * | 10/2014 | ......... G02B 27/0172 |
| WO | 2015/123775 A1 | 8/2015 | |

OTHER PUBLICATIONS

Äyräs et al., "Exit pupil expander with a large field of view based on diffractive optics," *Journal of the SID* 17(8):659-664, 2009.

Chellappan et al., "Laser-based displays: a review," *Applied Optics* 49(25):F79-F98, 2010.

Cui et al., "Diffraction from angular multiplexing slanted volume hologram gratings," *Optik* 116:118-122, 2005.

Curatu et al., "Dual Purpose Lens for an Eye-Tracked Projection Head-Mounted Display," International Optical Design Conference 2006, *SPIE-OSA* 6342:63420X-1-63420X-7, 2007.

Curatu et al., "Projection-based head-mounted display with eye-tracking capabilities," *Proc. of SPIE* 5875:58750J-1-58750J-9, 2005.

Essex, "Tutorial on Optomechanical Beam Steering Mechanisms," OPTI 521 Tutorial, College of Optical Sciences, University of Arizona, 8 pages, 2006.

Fernández et al., "Optimization of a thick polyvinyl alcohol-acrylamide photopolymer for data storage using a combination of angular and peristrophic holographic multiplexing," *Applied Optics* 45(29):7661-7666, 2009.

Hainich et al., "Chapter 10: Near-Eye Displays," *Displays: Fundamentals & Applications*, AK Peters/CRC Press, 2011, 65 pages.

Hornstein et al., "Maradin's Micro-Mirror-System Level Synchronization Notes," SID 2012 Digest, pp. 981-984.

International Search Report, dated Jun. 8, 2016, for PCT/US2016/018293, 17 pages.

International Search Report, dated Jun. 8, 2016, for PCT/US2016/018298, 14 pages.

International Search Report, dated Jun. 8, 2016, for PCT/US2016/018299, 12 pages.

Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

Kessler, "Optics of Near to Eye Displays (NEDs)," Presentation—Oasis 2013, Tel Aviv, Feb. 19, 2013, 37 pages.

Kress et al., "A review of head-mounted displays (HMD) technologies and applications for consumer electronics," *Proc. of SPIE* 8720:87200A-1-87200A-13, 2013.

Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.

Kress, "Optical architectures for see-through wearable displays," Presentation—Bay Area—SID Seminar, Apr. 30, 2014, 156 pages.

Levola, "7.1: *Invited Paper*: Novel Diffractive Optical Components for Near to Eye Displays," *SID Symposium Digest of Technical Papers* 37(1):64-67, 2006.

Liao et al., "The Evolution of MEMS Displays," *IEEE Transactions on Industrial Electronics* 56(4):1057-1065, 2009.

Lippert, "Chapter 6: Display Devices: RSD™ (Retinal Scanning Display)," *The Avionics Handbook*, CRC Press, 2001, 8 pages.

Majaranta et al., "Chapter 3—Eye-Tracking and Eye-Based Human-Computer Interaction," in *Advances in Physiological Computing*, Springer-Verlag London, 2014, pp. 17-39.

Schowengerdt et al., "Stereoscopic retinal scanning laser display with integrated focus cues for ocular accommodation" *Proc. of SPIE-IS&T Electronic Imaging* 5291:366-376, 2004.

Silverman et al., "58.5L: *Late News Paper*: Engineering a Retinal Scanning Laser Display with Integrated Accommodative Depth Cues," SID 03 Digest, pp. 1538-1541, 2003.

Takatsuka et al., "Retinal projection display using diffractive optical element," Tenth International Conference on Intelligent Information Hiding and Multimedia Signal Processing, IEEE, 2014, pp. 403-406.

Urey et al., "Optical performance requirements for MEMS-scanner based microdisplays," Conf. on MOEMS and Miniaturized Systems, *SPIE* 4178:176-185, 2000.

Urey, "Diffractive exit-pupil expander for display applications," *Applied Optics* 40(32):5840-5851, 2001.

Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).

International Search Report and Written Opinion dated Apr. 25, 2017 for corresponding International Application No. PCT/US2016/067246, 12 pages.

International Search Report and Written Opinion, dated Dec. 8, 2016, for International Application No. PCT/US2016/050225, 15 pages.

International Search Report and Written Opinion, dated Jan. 18, 2017, for International Application No. PCT/US2016/054852, 12 pages.

International Search Report and Written Opinion, dated Oct. 13, 2017, for International Application No. PCT/US2017/040323, 16 pages.

International Search Report and Written Opinion, dated Sep. 28, 2017, for International Application No. PCT/US2017/027479, 13 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

(56) References Cited

OTHER PUBLICATIONS

Merriam-Webster, "Radio Frequencies" retrieved from https://www.merriam-webster.com/table/collegiate/radiofre.htm, retrieved on Jul. 12, 2017, 2 pages.

* cited by examiner

SYSTEMS, DEVICES, AND METHODS FOR EYEBOXES WITH HETEROGENEOUS EXIT PUPILS

TECHNICAL FIELD

The present systems, devices, and methods generally relate to optical devices and particularly relate to engineering the eyebox of a wearable heads-up display.

BACKGROUND

Description of the Related Art

Holographic Optical Elements

For the purposes of the present systems, devices, and methods, a holographic optical element is an optical element that includes at least one hologram. Generally, a holographic optical element comprises one or more layer(s) of holographic material with at least one hologram recorded, embedded, stored, or included therein or thereon (collectively, "in"). A holographic optical element may be a film and/or laminate structure comprising any number of layers and any number of holograms per layer, depending on the specific application.

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A holographic optical element ("HOE") may be summarized as including: at least one layer of holographic material, wherein the at least one layer of holographic material includes: a first hologram to receive light from a light source and direct the light to a first exit pupil at or proximate an eye of a user, the first exit pupil having a first area; and a second hologram to receive light from the light source and direct the light to a second exit pupil at or proximate the eye of the user, the second exit pupil having a second area that is different from the first area.

The first hologram and the second hologram may be positioned and oriented with respect to one another to cause the first exit pupil and the second exit pupil to at least partially overlap with one another at the eye of the user. The first hologram and the second hologram may be positioned and oriented with respect to one another to cause the second exit pupil to encompass the first exit pupil at the eye of the user.

The first hologram and the second hologram may be positioned and oriented with respect to one another to cause the first exit pupil and the second exit pupil to be completely spatially-separated from one another at the eye of the user. The at least one layer of holographic material may further include at least one additional hologram, each additional hologram to receive light from the light source and direct the light to a respective exit pupil at or proximate the eye of the user, and each respective exit pupil may have a respective area that is different from the area of at least one of the other exit pupils.

The at least one layer of holographic material may include a holographic material selected from a group consisting of: a holographic film, a silver halide compound, and a photopolymer. The at least one layer of holographic material may include a first layer of holographic material and both the first hologram and the second hologram may be in the first layer of holographic material. Alternatively, the at least one layer of holographic material may include a first layer of holographic material and a second layer of holographic material, the second layer of holographic material carried by the first layer of holographic material, and the first hologram may be in the first layer of holographic material and the second holograms may be in the second layer of holographic material.

The first exit pupil may have a first geometry and the second exit pupil may have a second geometry that is different from the first geometry. The first hologram and the second hologram may both be multiplexed holograms that implement a same form of multiplexing, the form of multiplexing implemented by both the first hologram and the second hologram selected from a group consisting of: angle multiplexing, wavelength multiplexing, angle and wavelength multiplexing, and spatial multiplexing holograms. The first hologram may converge the light to the first exit pupil with a first rate of convergence and the second hologram may converge the light to the second exit pupil with the same first rate of convergence.

A wearable heads-up display ("WHUD") may be summarized as including: a support structure that in use is worn on a head of a user; a scanning laser projector carried by the support structure; and a holographic combiner carried by the support structure, wherein the holographic combiner is positioned within a field of view of an eye of the user when the support structure is worn on the head of the user, and wherein the holographic combiner comprises at least one layer of holographic material and the at least one layer of holographic material includes: a first hologram to receive light from the scanning laser projector and direct the light to a first exit pupil at or proximate the eye of the user, the first exit pupil having a first area; and a second hologram to receive light from the scanning laser projector and direct the light to a second exit pupil at or proximate the eye of the user, the second exit pupil having a second area that is different from the first area. The support structure may have a general shape and appearance of an eyeglasses frame and the holographic combiner may further include an eyeglass lens that carries the at least one layer of holographic material. The first hologram and the second hologram may be positioned and oriented with respect to one another to cause the first exit pupil and the second exit pupil to at least partially overlap with one another at the eye of the user. The first hologram and the second hologram may be positioned and oriented with respect to one another to cause the second exit pupil to encompass the first exit pupil at the eye of the user. The first hologram and the second hologram may be positioned and oriented with respect to one another to cause the first exit pupil and the second exit pupil to be completely spatially-separated from one another at the eye of the user.

The at least one layer of holographic material in the holographic combiner may further include at least one additional hologram, each additional hologram to receive light from the scanning laser projector and direct the light to a respective exit pupil at or proximate the eye of the user, and each respective exit pupil may have a respective area that is different from the area of at least one of the other exit pupils. The first exit pupil may have a first geometry and the second exit pupil may have a second geometry that is different from the first geometry. The first hologram and the second hologram of the holographic combiner may both be multiplexed holograms that implement a same form of multiplexing, the form of multiplexing implemented by both the first hologram and the second hologram selected from a group consisting of: angle multiplexing, wavelength multiplexing, angle and wavelength multiplexing, and spatial multiplexing. The first hologram may converge the light from the scanning laser projector to the first exit pupil with a first rate of convergence and the second hologram may converge the light from the scanning laser projector to the second exit pupil with either a different rate of convergence of with the same first rate of convergence A method of operating a WHUD, the WHUD including a scanning laser projector and a holographic combiner positioned within a field of view of an eye of a user when the WHUD is worn on a head of the user, may be summarized as including: directing a first light signal towards the holographic combiner by the scanning laser projector; redirecting the first light signal towards a first exit pupil that has a first area at or proximate the eye of the user by a first hologram of the holographic combiner; directing a second light signal towards the holographic combiner by the scanning laser projector; and redirecting the second light signal towards a second exit pupil that has a second area at or proximate the eye of the user by a second hologram of the holographic combiner, the second area different from the first area. Redirecting the first light signal towards a first exit pupil that has a first area at or proximate the eye of the user by a first hologram of the holographic combiner may include converging the first light signal towards the first exit pupil that has the first area at or proximate the eye of the user by the first hologram of the holographic combiner. Redirecting the second light signal towards a second exit pupil that has a second area at or proximate the eye of the user by a second hologram of the holographic combiner may include converging the second light signal towards the second exit pupil that has the second area at or proximate the eye of the user by the second hologram of the holographic combiner. Converging the first light signal towards the first exit pupil that has the first area at or proximate the eye of the user by the first hologram of the holographic combiner may include converging the first light signal towards the first exit pupil with a first rate of convergence by the first hologram of the holographic combiner, and converging the second light signal towards the second exit pupil may include converging the second light signal towards the second exit pupil with either a different rate of convergence or with the same first rate of convergence by the second hologram of the holographic combiner.

Redirecting the second light signal towards a second exit pupil that has a second area at or proximate the eye of the user by a second hologram of the holographic combiner may include redirecting the second light signal towards a second exit pupil that at least partially overlaps with the first exit pupil at or proximate the eye of the user by the second hologram of the holographic combiner. Redirecting the second light signal towards a second exit pupil that at least partially overlaps with the first exit pupil at or proximate the eye of the user by the second hologram of the holographic combiner may include redirecting the second light signal towards a second exit pupil that encompasses the first exit pupil at or proximate the eye of the user by the second hologram of the holographic combiner. The method may further include: directing at least one additional light signal towards the holographic combiner by the scanning laser projector; and redirecting each additional light signal towards a respective exit pupil at or proximate the eye of the user by a respective hologram of the holographic combiner, each respective exit pupil having a respective area that is different from the area of at least one of the other exit pupils.

A WHUD may be summarized as including: a support structure that in use is worn on a head of a user; a display module carried by the support structure and operative to provide a visual display to the user, wherein the visual display has an eyebox that comprises: a first exit pupil at or proximate an eye of the user, the first exit pupil having a first area; and at least second exit pupil at or proximate the eye of the user, the second exit pupil having a second area that is different from the first area. The first exit pupil and the second exit pupil may at least partially overlap with one another in the eyebox of the WHUD. The second exit pupil may encompass the first exit pupil in the eyebox of the WHUD. The first exit pupil and the second exit pupil may be completely spatially-separated from one another and not overlap at all in the eyebox of the WHUD. The eyebox of the visual display may further include at least one additional exit pupil, wherein each respective exit pupil may have a respective area that is different from the area of at least one of the other exit pupils.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
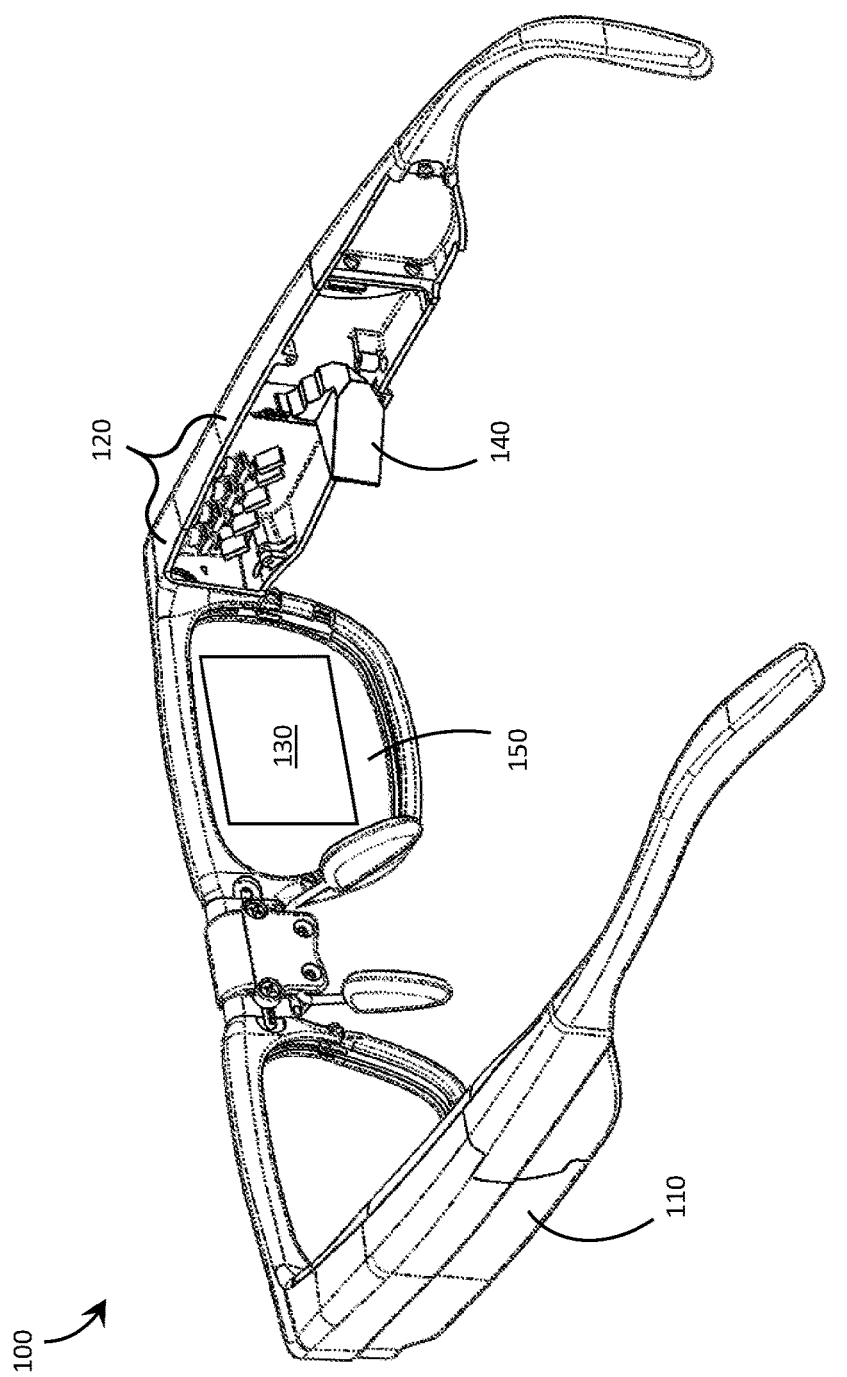
FIG. 1 is a partial-cutaway perspective view of a wearable heads-up display that implements multiple heterogeneous exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for engineering the eyebox and/or display interface of a wearable heads-up display (WHUD"). The eyebox and/or display interface of a WHUD is engineered by spatially and geometrically arranging multiple heterogeneous exit pupils at or proximate the eye of the user, where at least two of the exit pupils have different respective sizes (e.g., areas) and/or geometries. While the principles described herein are generally applicable to any form of optical device that employs an eyebox, they are particularly well-suited for use in near-eye display systems such as WHUDs. A specific example of an application of heterogeneous exit pupils in a scanning laser-based WHUD architecture is described.

Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full resolution and/or field of view of the display is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead but the eye's pupil may quickly leave the eyebox if and when the user glances anywhere off-center. A larger eyebox may be achieved by increasing the size of the exit pupil but this typically comes at the cost of reducing the display resolution and/or field of view.

Various examples of scanning laser-based WHUDs are described in, at least, U.S. Non-Provisional patent application Ser. No. 15/046,234, U.S. Non-Provisional patent application Ser. No. 15/046,254, and U.S. Non-Provisional patent application Ser. No. 15/046,269, each of which includes a holographic combiner positioned in the field of view of at least one of the user to receive light from the SLP and redirect (e.g., converge) the light towards the eye of the user. In accordance with the present systems, devices, and methods, such a holographic combiner may be engineered to provide multiple heterogeneous exit pupils at or proximate the eye of the user that, in combination, may form virtually any desired eyebox and/or display interface structure.

Some WHUD architectures, such as those referenced above, employ multiple exit pupils for the purpose of eyebox expansion by exit pupil replication. In such architectures, each respective exit pupil may typically correspond to an optically replicated or repeated instance of the same exit pupil. That is, each replicated or repeated instance of the exit pupil may have substantially the same size and geometry as the other instances of the exit pupil, meaning all exit pupils are substantially homogeneous. Spatially distributing multiple homogeneous instances of the same exit pupil over a relatively larger area of the user's eye may produce an expanded eyebox compared to the area of the single exit pupil on its own, and in such applications it is generally desirable for all instances of the exit pupil to have substantially the same size and shape. Conversely, in the present systems, devices, and methods, eyeboxes are engineered by a combination of heterogeneous exit pupils, at least two of which embody different sizes, shapes, and/or geometries. In this way, eyeboxes and/or display interfaces that are advantageous for certain applications may be provided.

FIG. 1 is a partial-cutaway perspective view of a WHUD 100 that implements multiple heterogeneous exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, a holographic combiner 130 that provides multiple heterogeneous exit pupils, and an optic 140 for routing light signals from SLP 120 to holographic combiner 130. Portions of SLP 120 and optic 140 may be contained within an inner volume of support structure 110; however, FIG. 1 provides a partial-cutaway view in which regions of support structure 110 have been removed in order to render visible portions of SLP 120 and optic 140 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory. In some implementations, SLP 120 may employ the systems, devices, and methods for focusing laser projectors described in U.S. Provisional Patent Application Ser. No. 62/322,128.

Optic 140 may perform a variety of different roles or may not be included at all depending on the specific implementation. For example, in some applications optic 140 may be a form of eyebox expansion optic such as any of those described in U.S. Non-Provisional patent application Ser. No. 15/046,234, U.S. Non-Provisional patent application Ser. No. 15/046,254, and U.S. Non-Provisional patent application Ser. No. 15/046,269. In the illustrated implementation of WHUD 100, SLP 120 is oriented to initially project light towards the ear of the user and optic 140 is used to re-route the projected light back towards holographic combiner 130. This configuration is used in WHUD 100 to influence/accommodate the form factor of support structure 110 and to provide a desired path length for the optical path of laser light projected from SLP 120 to holographic combiner 130, but alternative WHUD implementations may have different requirements and may or may not include an optic such as optic 140.

Holographic combiner 130 is a HOE that is positioned within a field of view of at least one eye of the user when support structure 110 is worn on the head of the user. Holographic combiner 130 is sufficiently optically transparent to wavelengths other than the wavelengths of laser light provided by SLP 120 in order to permit light from the user's environment (i.e., "environmental light") to pass through to the user's eye. In the illustrated example of FIG. 1, support structure 110 carries a transparent eyeglass lens 150 (e.g., a prescription eyeglass lens, non-prescription eyeglass lens) and holographic combiner 130 comprises at least one layer of holographic material that is adhered to, affixed to, laminated with, carried in or upon, or otherwise integrated with eyeglass lens 150. The at least one layer of holographic material may include a holographic film, a photopolymer such as Bayfol®HX available from Bayer MaterialScience AG, and/or a silver halide compound and may, for example, be integrated with transparent lens 150 using any of the techniques described in U.S. Provisional Patent Application Ser. No. 62/214,600. As will be described in more detail later, the at least one layer of holographic material in holographic combiner 130 includes i) a first hologram to receive light from SLP 120 and direct (e.g., reflect and converge, collimate, or diverge) the light to a first exit pupil having a first area at or proximate the eye of a user, and ii) a second hologram to receive light from SLP 120 and direct (e.g., reflect and converge, collimate, or diverge) the light to a second exit pupil having a second area at or proximate the eye of the user. Advantageously, the second area of the second exit pupil is different from (e.g., larger or smaller than) the first area of the first exit pupil and/or the first exit pupil has a first geometry (e.g., a first shape) and the second exit pupil has a second geometry (e.g., a second shape) that is different form the first geometry of the first exit pupil. The relative sizes and geometries of the first exit pupil and the second exit pupil may be selected to provide any desired eyebox geometry and/or display interface layout.

The term "area" is used herein to refer to both the magnitude (e.g., 10 mm²) and the shape/geometry (e.g., circular, elliptical, rectangular, irregular) of an exit pupil. In most conventional optical systems, an exit pupil has a generally round geometry, such as a substantially circular or elliptical geometry. In an exemplary implementation of the present systems, devices, and methods, multiple heterogeneous exit pupils may each adopt a similar circular geometry having a different size, but in other implementations a first exit pupil may adopt such a circular geometry and a second exit pupil may adopt a substantially different geometry, such as an elliptical or oval geometry, or an irregular amorphous geometry. In the first example, a first exit pupil and a second exit pupil may both be circular in shape but the magnitude of the first area of the first exit pupil may be different from the magnitude of the second area of the second exit pupil. In the second example, the first area of the first exit pupil and the second area of the second exit pupil may have the same magnitude but the respective shapes of the two exit pupils may be different. In both cases, the first area of the first exit pupil and the second area of the second exit pupil are considered herein to be "different" from one another.

Depending on the specific implementation, the first exit pupil and the second exit pupil may at least partially overlap with one another (e.g., the first exit pupil may at least partially overlap the second exit pupil and/or the second exit pupil may at least partially overlap the first exit pupil). As will be discussed in more detail later on, in some applications it may be advantageous for one exit pupil (e.g., the second exit pupil) to completely encompass another exit pupil (e.g., the first exit pupil); however, in still other applications the first exit pupil and the second exit pupil may be completely spatially-separated from one another at the eye of the user (i.e., may not overlap at all at the eye of the user). In accordance with the present systems, devices, and methods, the number, geometries, sizes and arrangement of heterogeneous exit pupils may advantageously be selected (e.g., engineered) to suit the eyebox and/or display interface requirements of any particular application.

Figure 2:
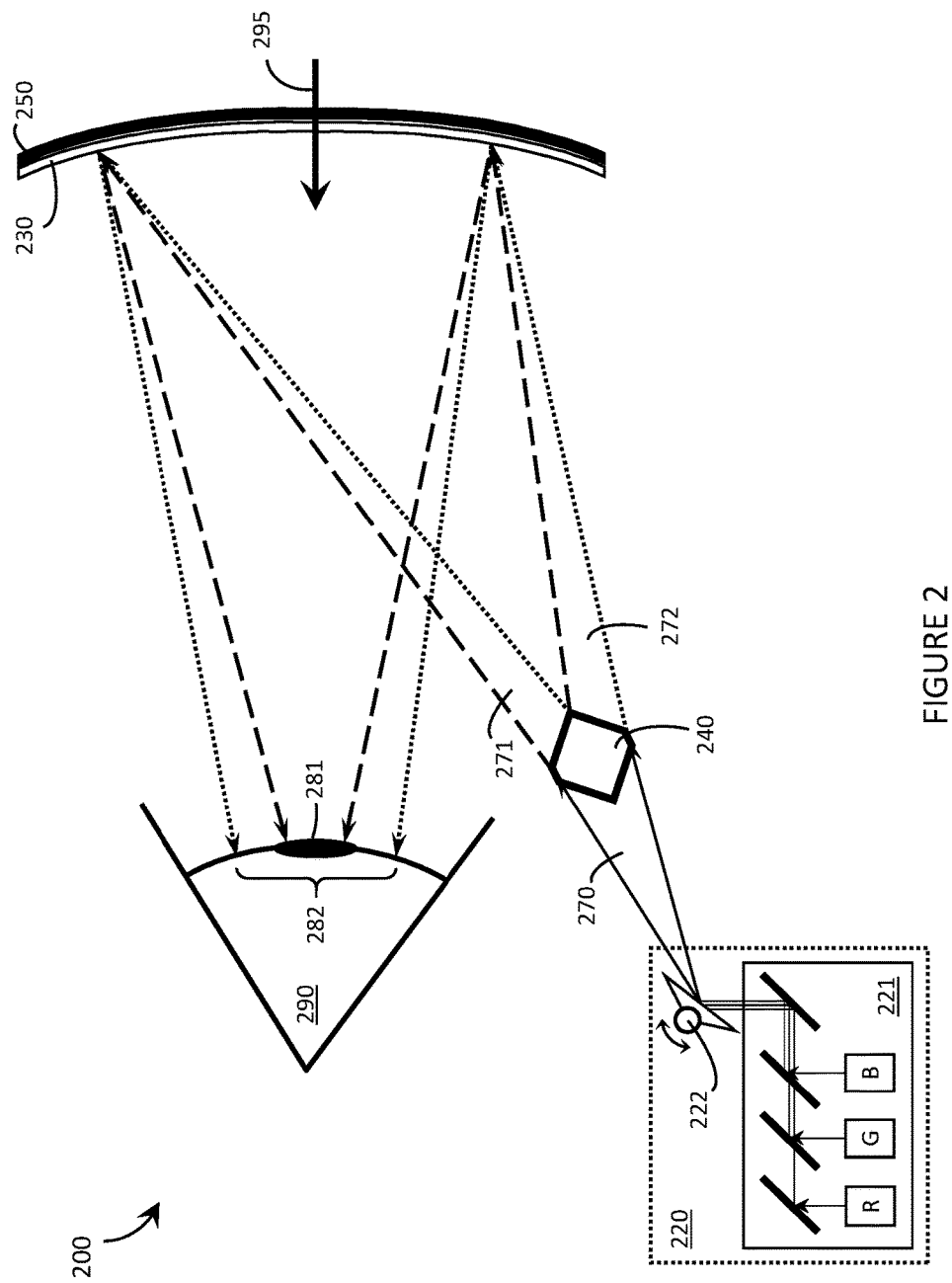
FIG. 2 is an illustrative diagram of a wearable heads-up display including a holographic combiner that provides multiple heterogeneous exit pupils at the eye of the user in accordance with the present systems, devices, and methods.

FIG. 2 is an illustrative diagram of a WHUD 200 including a holographic combiner 230 that provides multiple heterogeneous exit pupils 281 and 282 at the eye 290 of the user in accordance with the present systems, devices, and methods. WHUD 200 may be substantially similar to WHUD 100 from FIG. 1, although in FIG. 2 no support structure (e.g., support structure 110) is illustrated in order to reduce clutter. As with WHUD 100, WHUD 200 comprises a SLP 220 (which includes a RGB laser module 221 and at least one MEMS-based scan mirror 222) and holographic combiner 230 is carried by an eyeglass lens 250. As previously described, the combination of holographic combiner 230 and eyeglass lens 250 is sufficiently transparent (to wavelengths of light other than those provided by SLP 220) to allow environmental light 295 to pass through to eye 290.

Holographic combiner 230 includes an HOE comprising at least one layer of holographic material. The at least one layer of holographic material includes a first hologram and at least a second hologram. The first hologram receives a first set of light signals 271 (represented by lines with large dashes) from SLP 220 and directs (e.g., redirects and/or converges) first set of light signals 271 to a first exit pupil 281 at eye 290. As illustrated, first exit pupil 281 is generally positioned at the center of eye 290 and has a first size (e.g., area) that is slightly (e.g., about 10%) smaller than the pupil of eye 290. The second hologram receives a second set of light signals 272 (represented by dotted lines) from SLP 220 and directs (e.g., redirects and/or converges) second set of light signals 272 to a second exit pupil 282 at eye 290. As illustrated, second exit pupil 282 is generally positioned at the center of eye 290 and has a second size (e.g., area) that is much (e.g., about 100%) larger than that the pupil of eye 290. Second exit pupil 282 completely encompasses first exit pupil 281 at eye 290 in the illustrated example of WHUD 200. More detail of what this means for the user's point of view are described later on.

For the purposes of the present systems, devices, and methods, a "HOE" may or may not be transparent to certain wavelengths of light (e.g., to visible light having a wavelength or wavelengths that is/are not provided by SLP 220, such as most environmental light 295) while a "holographic combiner," such as holographic combiner 230, includes a HOE that is necessarily transparent to certain wavelengths of light (e.g., to visible light having a wavelength or wavelengths that is/are not provided by SLP 220, such as most environmental light 295) in order to "combine" light from SLP 220 and environmental light 295 into a single field of view at eye 290.

SLP 220 is shown generating (e.g., projecting) a single set of light signals 270 and WHUD 200 includes an optic 240 that divides, separates, or generally "splits" light signals 270 into first set of light signals 271 and second set of light signals 272. In this configuration, optic 240 may be an optical splitter such as those described in U.S. Non-Provisional patent application Ser. No. 15/046,254; however other configurations and/or other optical structures may be employed (such as, for example, those described in U.S. Non-Provisional patent application Ser. No. 15/046,234 and/or U.S. Non-Provisional patent application Ser. No. 15/046,269). As previously described, some implementations may not include an optic 240 positioned in between SLP 220 and holographic combiner 230.

Just as various implementations may or may not include an optic 240 to split, replicate, or otherwise distribute light signals 270 from SLP 22C0 en route to holographic combiner 230, the manner by which holographic combiner 230 routes certain light signals (e.g., first set of light signals 271) to a first exit pupil 281 and other light signals (e.g., second set of light signals 272) to a second exit pupil 282 may vary from one implementation to the next. For example, the first hologram and the second hologram included in holographic combiner 230 may be multiplexed holograms that implement any form of multiplexing, such as angle multiplexing, wavelength multiplexing, angle and wavelength multiplexing, or spatial multiplexing. In multiplexed implementations, the responsiveness of each hologram to laser light from SLP 220 is dependent on a particular property (e.g., angle of incidence, wavelength, spatial region of incidence, or any combination thereof) of that laser light as it impinges on holographic combiner 230.

In an angle-multiplexed example, the first hologram of holographic combiner 230 may generally be responsive to (i.e., may direct towards first exit pupil 281) first set of light signals 271 that are incident on holographic combiner 230 over a first range of angles of incidence and generally be unresponsive to light from SLP 220 that is incident on holographic combiner 230 at angles of incidence that are outside of the first range. Likewise, the second hologram of holographic combiner 230 may generally be responsive to (i.e., may direct towards second exit pupil 282) second set of light signals 272 that are incident on holographic combiner 230 over a second range of angles of incidence and generally be unresponsive to light from SLP 220 that is incident on holographic combiner 230 at angles of incidence that are outside of the second range.

In a wavelength-multiplexed example, the first hologram of holographic combiner 230 may generally be responsive to (i.e., may direct towards first exit pupil 281) first set of light signals 271 that are of a first wavelength (e.g., corresponding to laser light generated by a first one of the R, G, or B laser diodes in laser module 221 of SLP 220) and generally be unresponsive to light signals of other wavelengths. Likewise, the second hologram of holographic combiner 230 may generally be responsive to (i.e., may direct towards second exit pupil 282) second set of light signals 272 that are of a second wavelength (e.g., corresponding to laser light generated by a second one of the R, G, or B laser diodes in laser module 221 of SLP 220) and generally be unresponsive to light signals of other wavelengths.

In an angle- and wavelength-multiplexed example, the first hologram of holographic combiner 230 may generally be responsive to first set of light signals 271 that are both: i) of a first wavelength, and ii) incident on holographic combiner 230 over a first range of angles of incidence, and generally be unresponsive to light signals that are either: i) of a wavelength other than the first length, and/or ii) incident on holographic combiner 230 at angles of incidence that are outside of the first range. Likewise, the second hologram of holographic combiner 230 may generally be responsive to second set of light signals 272 that are of a different combination of wavelength and angle of incident than first set of light signals 271 to which the first hologram is responsive. For example, the second hologram of holographic combiner 230 may generally be responsive to second set of light signals 272 that are:

a) of the first wavelength and incident on holographic combiner 230 over a second range of angles of incidence; or b) of a second wavelength and incident on holographic combiner 230 over the first range of angles of incidence; or c) of a second wavelength and incident on holographic combiner 230 over a second range of angles of incidence.

In a spatially-multiplexed example, the first hologram of holographic combiner 230 may generally be responsive to first set of light signals 271 that are incident over a first holographic region of holographic combiner 230 and generally be unresponsive to light signals that are not incident on the first holographic region of holographic combiner 230. Likewise, the second hologram of holographic combiner 230 may generally be responsive to second set of light signals 272 that are incident over a second holographic region of holographic combiner 230 and generally be unresponsive to light signals that are not incident on the second holographic region of holographic combiner 230.

Systems, devices, and methods for HOEs and holographic combiners that implement at least some of the multiplexing approaches outlined above are described in at least U.S. Provisional Patent Application Ser. No. 62/156,736.

In the illustrated implementation of FIG. 2, holographic combiner 230 comprises a single layer of holographic material (e.g., holographic film, photopolymer, or a silver halide compound) and both the first hologram and the second hologram are in the single layer of holographic material. However, in other implementations, holographic combiner 230 may comprise multiple layers of holographic material and each respective layer of holographic material may include at least one respective hologram that is operative to direct at least a respective subset of light from SLP 220 to a respective heterogeneous exit pupil at eye 290. For example, holographic combiner 230 may comprise a first layer of holographic material and a second layer of holographic material, where the second layer of holographic material is carried by the first layer of holographic material (e.g., as a laminate structure) and the first hologram is in the first layer of holographic material and the second hologram is in the second layer of holographic material. Generally, throughout this specification and the concept of a hologram being "in" a layer of holographic material is used to capture situations where a hologram is recorded, embedded, or otherwise stored in a layer of holographic material but is also used in a loose sense to include situations in which a hologram is recorded, embedded, or stored "on" a layer of holographic material (e.g., a surface relief hologram).

In WHUD 200, both the first hologram and the second hologram are in the same layer of holographic material in holographic combiner 230 and both the first hologram and the second hologram have substantially the same area; however, the first hologram converges first set of light signals to first exit pupil 281 having a first area and the second hologram converges second set of light signals 272 to second pupil 282 having a second, larger area. Despite both originating from substantially the same distance and having substantially the same area, first exit pupil 281 and second exit pupil 282 have different areas (e.g., different diameters or different shapes) because the first hologram of holographic combiner 230 converges first set of light signals 271 to first exit pupil 281 at a first rate of convergence and the second hologram of holographic combiner 230 converges second set of light signals 272 to second exit pupil 282 at a second rate of convergence. The first rate of convergence provided by the first hologram is greater than the second rate of convergence provided by the second hologram, which is what causes, at least in part, the first area of first exit pupil 281 to be less than the second area of second exit pupil 282 at eye 290. This configuration can be advantageous for some applications, but in other applications it can be advantageous for multiple heterogeneous exit pupils (e.g., first exit pupil 281 and second exit pupil 282) to each be respectively formed by light having substantially the same rate of convergence.

Depending on the specific implementation, a WHUD that is operative to project multiple heterogeneous exit pupils as described herein (such as WHUD 200) may optionally project all or a subset of the multiple heterogeneous exit pupils (e.g., 281, 282, and/or 283) concurrently, in sequence, or "on demand" based on, for example, information from an eye tracker indicating the position of the entrance pupil to the user's eye relative to the positions of the multiple heterogeneous exit pupils. When multiple heterogeneous exit pupils are projected concurrently, overlapping regions of adjacent exit pupils that are aligned to provide the same content to the user may result in increased brightness due to the additive contribution of the multiple overlapping exit pupils.

Figure 3:
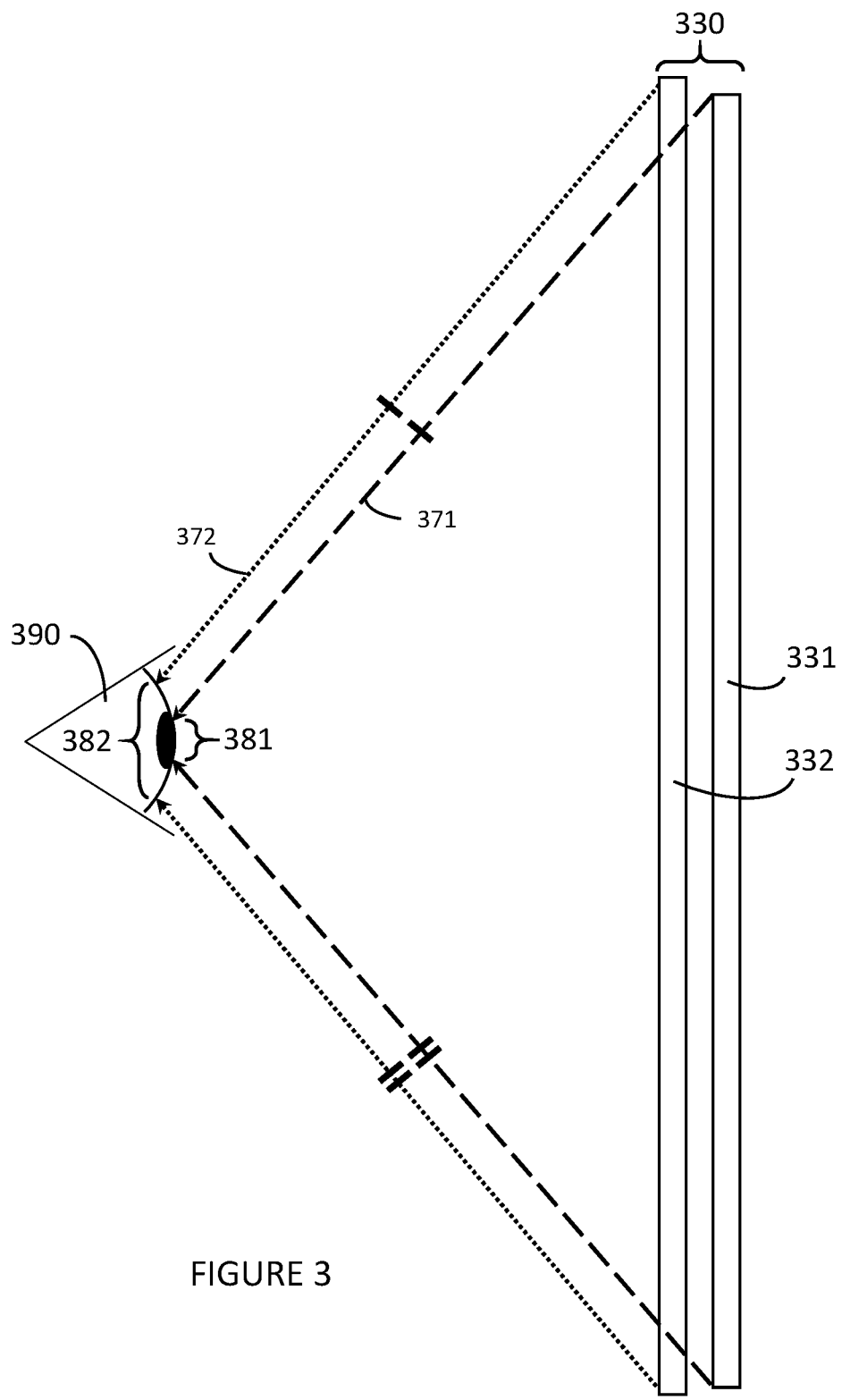
FIG. 3 is an illustrative diagram showing a simplified operation of a holographic optical element that provides multiple heterogeneous exit pupils in accordance with the present systems, devices, and methods.

FIG. 3 is an illustrative diagram showing a simplified operation of a HOE 330 that provides multiple heterogeneous exit pupils 381, 382 in accordance with the present systems, devices, and methods. HOE 330 is similar to holographic combiner 230 from FIG. 2 in that HOE 330 converges two sets of light signals 371, 372 to two heterogeneous exit pupils 381, 382, respectively, but unlike holographic combiner 230 from FIG. 2, HOE 330 converges both sets of light signals 371, 372 with substantially the same rate of convergence to respective ones of heterogeneous exit pupils 381 and 382. HOE 330 comprises two layers of holographic material 331, 332, where a first hologram that converges first set of light signals 371 to first exit pupil 381 is in a first layer of holographic material 331 and a second hologram that converges second set of light signals 372 to second exit pupil 382 is in a second layer of holographic material 332. Second exit pupil 382 completely encompasses first exit pupil 381 at eye 390 and, because both the first hologram in first layer of holographic material 331 and the second hologram in second layer of holographic material 332 apply substantially the same rate of convergence to first set of light signals 371 and second set of light signals 372, respectively, the optical paths of second set of light signals 372 from HOE 330 to eye 390 are substantially parallel to the optical paths of first set of light signals 371 from HOE 330 to eye 390. In other words, all of the angles of incidence of first set of light signals 371 in exit pupil 381 at eye 390 are also available in in second set of light signals 372 in exit pupil 382 at eye 390.

In a virtual retina display such as scanning laser-based WHUD 200 from FIG. 2, there may not be an "image" formed outside of the eye of the user. There is typically no microdisplay or projection screen or other place where the projected image is visible to a third party; rather, the image may be formed completely within the eye of the user. For this reason, it may be advantageous for a scanning laser-based WHUD to be designed to accommodate the manner in which the eye forms an image.

For a light signal entering the eye (e.g., a light ray, a wavefront, an incident beam from a SLP, or similar), the eye (or more accurately, the combination of the eye and the human brain) may determine "where" the light signal is positioned in the user's field of view based on the region of the retina that is illuminated by the light signal. Two light signals that illuminate the same region of the retina may appear in the same position in the user's field of view. The particular region of the retina that is illuminated by any given light signal is determined by the angle and not the location at which the light signal enters the eye. Thus, two light signals may appear in the same position in the user's field of view even if they enter different location of the user's pupil provided that the two light signals have the same angle of incidence when they enter the user's eye. The geometry of the eye's lens is such that any two light signals entering the eye at the same angle, regardless of the position/location at which the light signals enter the eye, may generally be directed to the same region of the retina and so may generally appear in the same position in the user's field of view.

Returning to HOE 330 of FIG. 3, the fact that first exit pupil 381 and second exit pupil 382 both receive light signals that span the same range of angles of incidence (due to both the first hologram and the second hologram of HOE 330 applying the same rate of convergence to first light signals 371 and second light signals 372, respectively) means that both first exit pupil 381 and second exit pupil 382 can display virtual content in all of the same spatial positions; however, the fact that first exit pupil 381 is smaller than the entrance pupil of eye 390 and second exit pupil 382 is larger than the entrance pupil of eye 390 impacts the way in which the user sees the virtual content displayed thereby. First exit pupil 381 is completely encompassed by the entrance pupil of eye 390, which means that (for the pupil position shown in FIG. 3) the user is able to see all virtual content at all of the spatial positions corresponding to all of the angles of incidence of light rays that converge to first exit pupil 381 without moving the entrance pupil position of eye 390 (i.e., without changing their gaze direction). In other words, first exit pupil 381 has a relatively wide field of view for the illustrated position of the entrance pupil to eye 390 but a sufficient change to the position of the entrance pupil of eye 390 (i.e., a sufficient change in the gaze direction of the user) may move the entrance pupil of eye 390 completely outside of first exit pupil 390. The result of such misalignment between first exit pupil 381 and the entrance pupil of eye 390 is that the user will not be able to see any of the display content provided by first exit pupil 381 while first exit pupil 381 does not overlap at all with entrance pupil of eye 390. On the other hand, second exit pupil 382 completely encompasses the entrance pupil of eye 390, which means that the user is able to see display content via second exit pupil 382 over a much wider range of eye positions and/or gaze directions (e.g., over all eye positions and/or gaze directions if second exit pupil 382 is sufficiently large) compared to first exit pupil 381. But as a consequence of second exit pupil 382 being larger than the entrance pupil of eye 390, there is no single eye position and/or gaze direction for eye 390 that enables the user to see all of the display content provided by second exit pupil 382 simultaneously. In other words, second exit pupil 382 provides a relatively narrow field of view and the total display area may extend outside of this field of view. The effect may be similar to that of gazing through a spyglass or lighting up a dark object with a spotlight: a large area of display content may be "there" but the user may need to scan their eye over a range of eye positions like a spotlight in order to see the entire area.

The respective sizes of first exit pupil 381 (being smaller than the entrance pupil of eye 390) and second exit pupil 382 (being larger than the entrance pupil of eye 390) offer respective advantages and disadvantages, at least some of which are outlined above. In accordance with the present systems, devices, and methods, the heterogeneous combination of a relatively small exit pupil (e.g., first exit pupil 381) and a relatively large exit pupil (e.g., second exit pupil 382) can simultaneously take advantage of the benefits of both pupil sizes while mitigating the disadvantages of each, especially when both exit pupils are engineered to have substantially the same convergence rates. In the case of HOE 330, the user may see the entire display area in a large field of view while the entrance pupil of eye 390 is positioned to completely encompass first exit pupil 381 as illustrated in FIG. 3 (in which position second exit pupil 382 is duplicative of a central "spotlight" region of the same display area, which may advantageously enhance brightness in the foveal region of the user's field of view), and the user may also see smaller "spotlit" views of the display area via second exit pupil 382 when the user moves their gaze direction such that first exit pupil 381 no longer aligns with the entrance pupil of eye 390. For example, if the user gazes far to the bottom of their field of view such that the entrance pupil of eye 390 moves completely outside of first exit pupil 381, the user will no longer be able to see any of the display content via first exit pupil 381 and the user will only be able to see a "spotlight" field of view of portions from the bottom of the display area that converge to the bottom of second exit pupil 382; however, since the user is gazing to the bottom it is quite intuitive for the user to only see the bottommost portions of the display area in that eye position and such is certainly an improvement over not being able to see any of the display area at all, as would be the case if first exit pupil 381 were present on its own (i.e., without the larger heterogeneous counterpart: second exit pupil 382).

In the illustrated examples of FIGS. 2 and 3, respective combinations of two heterogeneous exit pupils are used for illustrative purposes only. Indeed, the present systems, devices, and methods may be extended to include any number of exit pupils in any combination of size and/or geometry, provided that at least two exit pupils are different from one another with respect to at least one of size and geometry. In other words, either or both of holographic combiner 230 and/or HOE 330 may be extended to include at least one additional hologram, where each additional hologram is engineered to receive light from the light source (e.g., the SLP 220) and direct the light to a respective exit pupil at or proximate the eye of the user. The respective exit pupil corresponding to each additional hologram may have a respective area that is different from the area of at least one of the other exit pupils.

Figure 4:
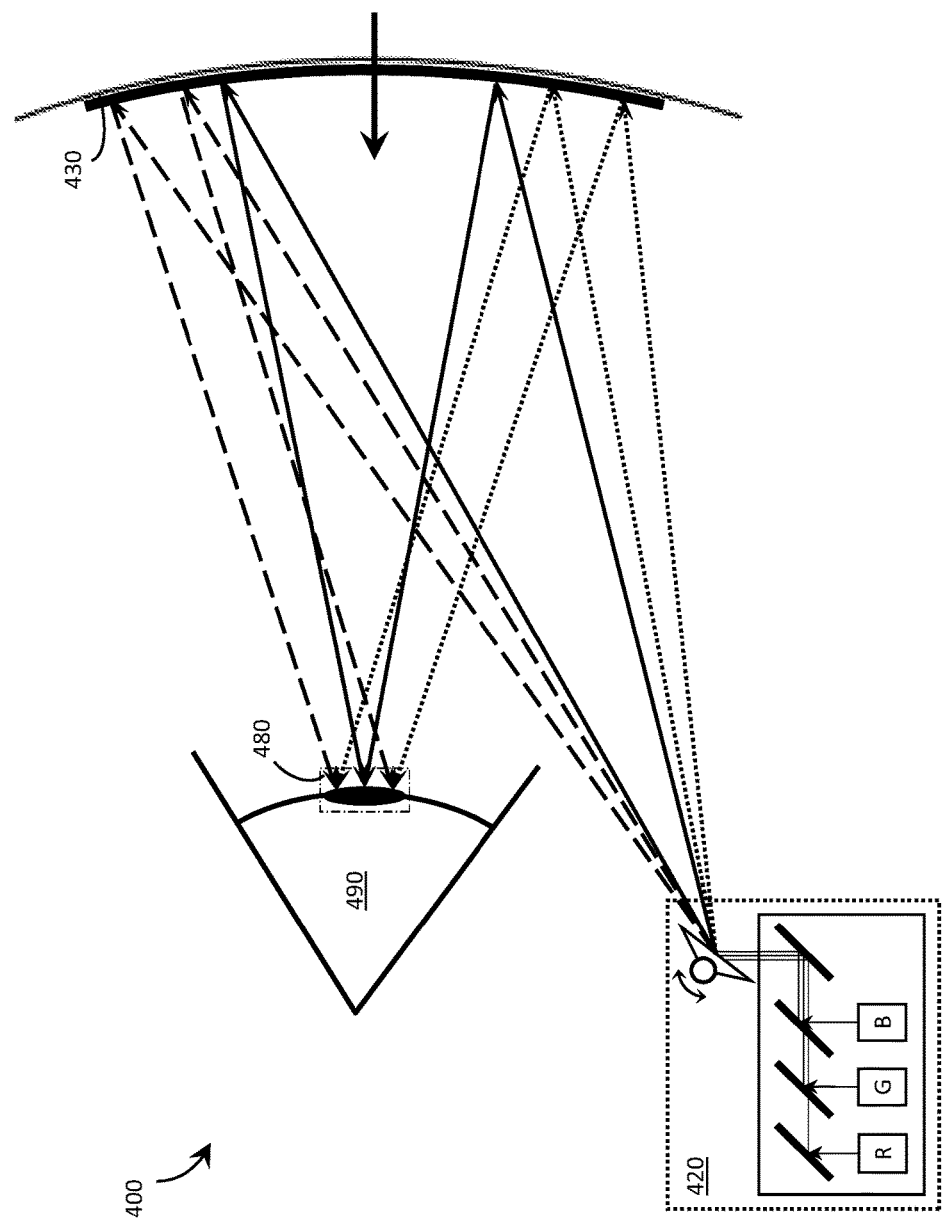
FIG. 4 is an illustrative diagram of a wearable heads-up display including a holographic combiner that provides multiple heterogeneous exit pupils at the eye of the user in accordance with the present systems, devices, and methods.

FIG. 4 is an illustrative diagram of a WHUD 400 including a holographic combiner 430 that provides multiple heterogeneous exit pupils at the eye 490 of the user in accordance with the present systems, devices, and methods. WHUD 400 includes a SLP 420 (no support structure is shown in order to reduce clutter, similar to WHUD 200 in FIG. 2) and holographic combiner 430 includes three spatially-multiplexed holograms each of which receives light from SLP 420 over a respective holographic region of holographic combiner 430 and redirects such light to a respective heterogeneous exit pupil to engineer a particular eyebox 480 at eye 490. Eyebox 480 includes: a first, relatively small area and relatively large field of view exit pupil that is centrally positioned at eye 490 (represented by the convergence of a pair of solid lines at eye 490); a second, relatively large area and relatively small field of view exit pupil that encompasses all of the entrance pupil of eye 490 (represented by a pair of nearly parallel lines with large dashes at eye 490); and a third, relatively large area and relatively small field of view exit pupil that encompasses all of the entrance pupil of eye 490 (represented by a pair of nearly parallel dotted lines at eye 490). The configuration of eyebox 490 may allow a display interface in which the first "large field of view" exit pupil (solid lines) may provide a "main" display interface at which application content is displayed but is only visible to the user when the user is gazing straight ahead, while the second and third "small field of view" exit pupils (dashed lines and dotted lines, respectively) may each provide a respective "narrow banner" display area at the top and bottom, respectively, of the user's field of view that is generally visible to the user over a wide range of eye positions and/or gaze directions (e.g., all eye positions and/or gaze directions). The top and bottom "banner displays" may be used to provide, for example, notifications and other display content that the user may not wish to focus on in much detail but that the user may wish to have presented in their field of view regardless of the direction in which the user is gazing.

While FIG. 4 depicts an eyebox configuration in which multiple heterogeneous exit pupils are combined to provide two horizontally-elongated rectangular (i.e., "banner") "always visible" display regions flanking a broader central display region, the present systems, devices, and methods may be employed to engineer any layout of display interface depending on the specific implementation.

Figure 5:
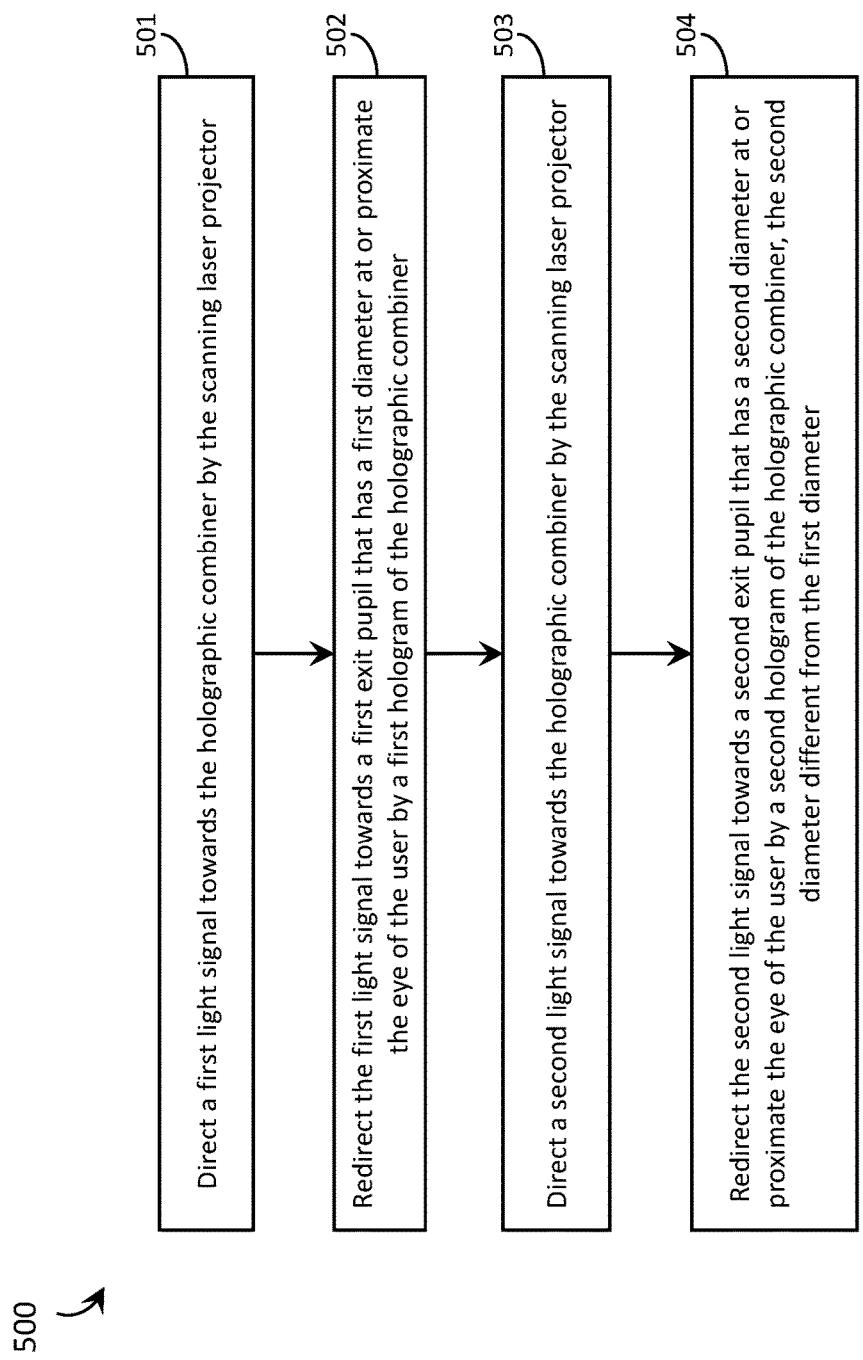
FIG. 5 is a flow-diagram showing a method of operating a wearable heads-up display in accordance with the present systems, devices, and methods.

FIG. 5 is a flow-diagram showing a method 500 of operating a WHUD in accordance with the present systems, devices, and methods. The WHUD may be substantially similar to WHUD 100, WHUD 200, or WHUD 400 and generally includes a SLP and a holographic combiner. Method 500 includes four acts 501, 502, 503, and 504, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 500, the term "user" refers to a person that is wearing the WHUD.

At 501, the SLP directs a first light signal towards the holographic combiner. The first light signal may correspond to all or a portion of an image, such as one or more pixel(s) of an image. The image may include any visual representation of data, including a photograph, a drawing, text, a chart or graph, a picture, a video (e.g., a still or frame from a video or animation), and so on.

At 502, a first hologram of the holographic combiner redirects the first light signal towards a first exit pupil at or proximate the eye of the user. The first exit pupil has a first area and/or a first geometry. In some implementations, the first hologram of the holographic combiner may redirect the first light signal by reflecting and/or converging the first light signal towards the first exit pupil at or proximate the eye of the user. When the first hologram converges the first light signal towards the first exit pupil, the first hologram may do so by applying a first rate of convergence to the first light signal and redirecting the first light signal towards the eye of the user.

At 503, the SLP directs a second light towards the holographic combiner. The second light signal may correspond to all or a different portion of the same image as the first light signal from act 501, or the second light signal may correspond to all or a portion of a second image that is different from the image to which the first light signal from act 501 corresponds.

At 504, a second hologram of the holographic combiner redirects the second light signal towards a second exit pupil at or proximate the eye of the user. The second exit pupil has at least one of a second area that is different from the first area of the first exit pupil and/or a second geometry that is different from the first geometry of the first exit pupil. In some implementations, the second hologram of the holographic combiner may redirect the second light signal by reflecting and/or converging the second light signal towards the second exit pupil at or proximate the eye of the user. When the second hologram converges the second light signal towards the second exit pupil, the second hologram may do so by applying a second rate of convergence to the second light signal and redirecting the second light signal towards the eye of the user, where the second rate of convergence may be different from the first rate of convergence from act 502 or, as illustrated in the example of FIG. 3, the second rate of convergence may be substantially the same as the first rate of convergence from act 502.

As previously described, in some implementations the second hologram of the holographic combiner may redirect the second light signal (per act 504) towards a second exit pupil that at least partially overlaps with or even encompasses the first exit pupil (from act 502) at or proximate the eye of the user.

In some implementations, method 500 may be extended by having the SLP direct at least one additional light signal towards the holographic combiner. In this case, a different respective hologram of the holographic combiner may redirect each additional light signal towards a different respective exit pupil at or proximate the eye of the user, where each respective exit pupil may have a respective area and/or geometry that is different from the area and/or geometry of at least one of the other exit pupils.

The present systems, devices, and methods may be applied or otherwise incorporated into any WHUD architecture that employs or can be adapted to employ multiple exit pupils. For example, many WHUD architectures that employ waveguide structures (e.g., positioned in the field of view of the user, such as in a transparent combiner optic) use multiple exit pupils as a means for eyebox expansion. The systems, devices, and methods for engineering eyeboxes with heterogeneous exit pupils described herein may be applied to such architectures. At a general level, a WHUD that employs the present systems, devices, and methods may comprise a support structure that in use is worn on the head of a user (e.g., support structure 110) and a display module carried by the support structure and operative to provide a visual display to the user (such as the combination of SLP 220 and holographic combiner 230, or a conventional combination of a microdisplay and a transparent waveguide structure positioned in a field of view of the user and operative to route content displayed by the microdisplay to the eye of the user). The teachings herein may be applied to any such generic display module (e.g., to a holographic combiner or to a waveguide structure) to engineer an eyebox that reaps the benefits of heterogeneous exit pupils by providing a first exit pupil having a first area and a second exit pupil having a second area that is different from the first area.

The term "wavelength" is used loosely herein to refer to a relatively narrow (e.g., within 10% or 15%) waveband of light, as most "single wavelength" laser diodes generally provide light signals over such a narrow waveband.

The HOEs described herein may generally be substantially flat or planar in geometry or, as illustrated in FIG. 2, may embody some curvature. In some implementations, a holographic combiner (e.g., holographic combiner 230) may embody curvature because the holographic combiner is carried by a prescription eyeglass lens (e.g., 250) that has some curvature. When necessary, an holographic combiner may include systems, devices, and/or methods for curved holographic optical elements described in U.S. Provisional Patent Application Ser. No. 62/268,892.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/or otherwise direct projected light signals. Unless the specific context requires otherwise, a person of skill in the art will appreciate that references to a "SLP" throughout the present systems, devices, and methods are generic to other light sources (combined with other optics, as necessary) that may be applied or adapted for application to accomplish the same general function(s) associated with the SLPs described herein.

A person of skill in the art will appreciate that the various embodiments for eyeboxes comprising heterogeneous exit pupils described herein may be applied in non-WHUD applications. For example, the present systems, devices, and methods may be applied in non-wearable heads-up displays and/or in other projection displays, including virtual reality displays, in which the holographic combiner need not necessarily be transparent.

In some implementations that employ multiple exit pupils, all exit pupils may optionally be active at all times (allowing for temporal separation). Alternatively, some WHUD implementations may employ eye-tracking to determine the particular display region(s) towards which the user is gazing and may activate only the exit pupil(s) that correspond(s) to where the user is looking while one or more exit pupil(s) that is/are outside of the user's field of view may be deactivated. An eye tracker included in any of the implementations of WHUDs described herein may employ any of a variety of different eye tracking technologies depending on the specific implementation. For example, an eye tracker may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041.

Multiplexed exit pupils may advantageously enable a user to see displayed content while gazing in a wide range of directions. Furthermore, multiplexed exit pupils may also enable a wider variety of users having a wider range of eye arrangements to adequately see displayed content via a given WHUD. Anatomical details such as interpupillary distance, eye shape, relative eye positions, and so on can all vary from user to user. The various exit pupil multiplexing methods described herein may be used, together with heterogeneous exit pupils, to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. For example, at least one of the SLP and/or the optical splitter may be physically movable and/or rotatable on the support structure and the user may physically move and/or rotate the SLP and/or the optical splitter to change a position of at least one of the N exit pupils relative to the eye. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser.

No. 14/155,107, PCT Patent Application PCT/US2014/057029, and/or U.S. Provisional Patent Application Ser. No. 62/236,060.

The various implementations of WHUDs described herein may include any or all of the technologies described in U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/156,736, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/322,128, U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Provisional Patent Application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, and/or U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display ("WHUD") comprising:
a support structure that in use is worn on a head of a user;
a scanning laser projector carried by the support structure, the scanning laser projector to generate display content; and
a holographic combiner carried by the support structure, wherein the holographic combiner is positioned within a field of view of an eye of the user when the support structure is worn on the head of the user, the holographic combiner to receive display content from the scanning laser projector and redirect the display content towards the eye of the user when the support structure is worn on the head of the user, and wherein the holographic combiner comprises at least one layer of holographic material and the at least one layer of holographic material includes:
a first hologram to converge the display content to a first exit pupil at the eye of the user, the first exit pupil having a first area at the eye of the user that is smaller than an entrance pupil of the eye of the user when the support structure is worn on the head of the user, the first exit pupil to provide a first field of view that includes an entire display area of the display content to the eye of the user; and
a second hologram to converge the display content to a second exit pupil at the eye of the user, the second exit pupil having a second area at the eye of the user, wherein the second area of the second exit pupil is larger than the first area of the first exit pupil at the eye of the user and larger than an entrance pupil of the eye of the user when the support structure is worn on the head of the user, the second exit pupil to provide a second field of view that includes only a portion of the display area of the display content to the eye of the user, the display area of the display content extending outside of the second field of view of the second exit pupil, and wherein the first exit pupil and the second exit pupil at least partially overlap with one another at the eye of the user.

2. The WHUD of claim 1 wherein the support structure has a general shape and appearance of an eyeglasses frame, and wherein the holographic combiner further comprises an eyeglass lens that carries the at least one layer of holographic material.

3. The WHUD of claim 1 wherein the first hologram and the second hologram are positioned and oriented with respect to one another to cause the second exit pupil to encompass the first exit pupil at the eye of the user.

4. The WHUD of claim 1 wherein the at least one layer of holographic material in the holographic combiner further includes at least one additional hologram, each additional hologram to receive display content from the scanning laser projector and converge the display content to a respective exit pupil at the eye of the user, and wherein each respective exit pupil has a respective area at the eye of the user that is different from the area of at least one of the other exit pupils at the eye of the user.

5. The WHUD of claim 1 wherein the first exit pupil has a first geometry and the second exit pupil has a second geometry that is different from the first geometry.

6. The WHUD of claim 1 wherein the first hologram and the second hologram of the holographic combiner are both multiplexed holograms that implement a same form of multiplexing, the form of multiplexing implemented by both the first hologram and the second hologram selected from a group consisting of: angle multiplexing, wavelength multiplexing, angle and wavelength multiplexing, and spatial multiplexing.

7. The WHUD of claim 1 wherein the first hologram converges the light from the scanning laser projector to the first exit pupil with a first rate of convergence and the second hologram converges the light from the scanning laser projector to the second exit pupil with the same first rate of convergence.

8. A method of operating a wearable heads-up display ("WHUD"), the WHUD including a scanning laser projector and a holographic combiner positioned within a field of view of an eye of a user when the WHUD is worn on a head of the user, the method comprising:
directing a first light signal towards the holographic combiner by the scanning laser projector;
redirecting, by a first hologram of the holographic combiner, the first light signal towards a first exit pupil that has a first area at the eye of the user, the first area of the first exit pupil smaller than an entrance pupil of the eye of the user to provide a first field of view that includes an entire display area of virtual content to the eye of the user;
directing a second light signal towards the holographic combiner by the scanning laser projector; and
redirecting, by a second hologram of the holographic combiner, the second light signal towards a second exit pupil that has a second area at the eye of the user, the second area larger than the first area at the eye of the user and the second area larger than the entrance pupil of the eye of the user to provide a second field of view that includes only a portion of the display area of the virtual content to the eye of the user, the display area of the virtual content extending outside of the second field of view of the second exit pupil, wherein the first exit pupil and the second exit pupil at least partially overlap with one another at the eye of the user.

9. The method of claim 8 wherein:
redirecting, by a first hologram of the holographic combiner, the first light signal towards a first exit pupil that has a first area at the eye of the user includes converging, by the first hologram of the holographic combiner, the first light signal towards the first exit pupil that has the first area at the eye of the user; and
redirecting, by a second hologram of the holographic combiner, the second light signal towards a second exit pupil that has a second area at the eye of the user includes converging, by the second hologram of the holographic combiner, the second light signal towards the second exit pupil that has the second area at the eye of the user.

10. The method of claim 9 wherein converging, by the first hologram of the holographic combiner, the first light signal towards the first exit pupil that has the first area at the eye of the user includes converging, by the first hologram of the holographic combiner, the first light signal towards the first exit pupil with a first rate of convergence by the first hologram of the holographic combiner and converging, by the second hologram of the holographic combiner, the second light signal towards the second exit pupil includes converging, by the second hologram of the holographic combiner, the second light signal towards the second exit pupil with the same first rate of convergence by the second hologram of the holographic combiner.

11. The method of claim 8 wherein redirecting, by a second hologram of the holographic combiner, the second light signal towards a second exit pupil that has a second area at the eye of the user includes redirecting, by the second hologram of the holographic combiner, the second light signal towards a second exit pupil that encompasses the first exit pupil at the eye of the user.

12. The method of claim 8, further comprising:
directing at least one additional light signal towards the holographic combiner by the scanning laser projector; and
redirecting each additional light signal towards a respective exit pupil at the eye of the user by a respective hologram of the holographic combiner, each respective exit pupil having a respective area at the eye of the user that is different from the area of at least one of the other exit pupils at the eye of the user.

13. A wearable heads-up display ("WHUD") comprising:
a support structure that in use is worn on a head of a user;
a display module carried by the support structure and operative to provide a visual display to the user, wherein the visual display has an eyebox that comprises:
a first exit pupil at an eye of the user, the first exit pupil having a first area at the eye of the user that is smaller than an entrance pupil of the eye of the user, the first exit pupil to provide a first field of view that includes an entire display area of the visual display to the eye of the user; and
at least a second exit pupil at the eye of the user, the second exit pupil having a second area at the eye of the user that is larger than the first area of the first exit pupil at the eye of the user and larger than the entrance pupil of the eye of the user, the second exit pupil to provide a second field of view that includes only a portion of the display area of the visual display to the eye of the user, the display area of the virtual display extending outside of the second field of view of the second exit pupil, and wherein the first exit pupil and the second exit pupil at least partially overlap with one another in the eyebox of the WHUD.

14. The WHUD of claim 13 wherein the second exit pupil encompasses the first exit pupil in the eyebox of the WHUD.

15. The WHUD of claim 13 wherein the eyebox of the visual display further comprises at least one additional exit pupil, wherein each respective exit pupil has a respective area at the eye of the user that is different from the area of at least one of the other exit pupils at the eye of the user.

* * * * *